(12) United States Patent
Chiang et al.

(10) Patent No.: US 8,897,557 B2
(45) Date of Patent: Nov. 25, 2014

(54) METHOD OF AUTO-DETERMINATION A THREE-DIMENSIONAL IMAGE FORMAT

(71) Applicant: Chunghwa Picture Tubes, Ltd., Taoyuan (TW)

(72) Inventors: Chih-Yin Chiang, Nantou County (TW); Che-Wei Chang, Taoyuan County (TW)

(73) Assignee: Chunghwa Picture Tubes, Ltd., Longtan Township, Taoyuan County (TW)

( * ) Notice: Subject to any disclaimer, the term of this patent is extended or adjusted under 35 U.S.C. 154(b) by 93 days.

(21) Appl. No.: 13/783,384

(22) Filed: Mar. 3, 2013

(65) Prior Publication Data
US 2014/0205190 A1 Jul. 24, 2014

(30) Foreign Application Priority Data
Jan. 18, 2013 (TW) .............................. 102101930 U

(51) Int. Cl.
*G06T 15/00* (2011.01)
*H04N 13/00* (2006.01)
(52) U.S. Cl.
CPC ..................................... *H04N 13/00* (2013.01)
USPC .......................................................... 382/166
(58) Field of Classification Search
USPC .................................. 382/166, 167, 232, 233
See application file for complete search history.

(56) References Cited

U.S. PATENT DOCUMENTS

2010/0260418 A1* 10/2010 Tsai et al. ..................... 382/166

FOREIGN PATENT DOCUMENTS

TW 201143368 12/2011

* cited by examiner

*Primary Examiner* — Duy M Dang
(74) *Attorney, Agent, or Firm* — Winston Hsu; Scott Margo

(57) ABSTRACT

A method of auto-determination a three-dimensional image format includes a processor receiving an image signal; the processor capturing a plurality of frames from the image signal; the processor determining whether a red sub-pixel gray-level, a green sub-pixel gray-level, and a blue sub-pixel gray-level of each pixel of a right half side of each frame of the plurality of frames are the same; and the processor determining that the image signal has a two-dimensional image plus depth information three-dimensional image format when the red sub-pixel gray-level, the green sub-pixel gray-level, and the blue sub-pixel gray-level of the pixel are the same.

20 Claims, 7 Drawing Sheets

METHOD OF AUTO-DETERMINATION A THREE-DIMENSIONAL IMAGE FORMAT

BACKGROUND OF THE INVENTION

1. Field of the Invention

The present invention relates to a method of auto-determination a three-dimensional image format, and particularly to a method of auto-determination a three-dimensional image format that can utilize a processor to determine an image format of an image signal according to characteristics of various three-dimensional image formats.

2. Description of the Prior Art

Please refer to FIG. 1, FIG. 2, FIG. 3, and FIG. 4. FIG. 1 is a diagram illustrating a side-by-side three-dimensional image format, FIG. 2 is a diagram illustrating a top-and-bottom three-dimensional image format, FIG. 3 is a diagram illustrating a frame packing three-dimensional image format, and FIG. 4 is a diagram illustrating a two-dimensional image plus depth information three-dimensional image format. As shown in FIG. 1, each frame of the side-by-side three-dimensional image format includes a left eye image and a right eye image side by side. As shown in FIG. 2, each frame of the top-and-bottom three-dimensional image format includes a left eye image and a right eye image from top to bottom, where vertical size of the left eye image and the right eye image is decreased to 50% and horizontal size of the left eye image and the right eye image is not changed. As shown in FIG. 3, an image arrangement method of the frame packing three-dimensional image format is the same as an image arrangement method of the top-and-bottom three-dimensional image format, but the frame packing three-dimensional image format has a 45 pixels black frame between a left eye image and a right eye image of each frame. As shown in FIG. 4, an image arrangement method of the two-dimensional image plus depth information three-dimensional image format is the same as an image arrangement method of the side-by-side three-dimensional image format, but a right side image of each frame of the two-dimensional image plus depth information three-dimensional image format is changed to gray-level depth information. Therefore, the two-dimensional image plus depth information three-dimensional image format can be used for calculating multi-view images for an auto-stereoscopic technology.

When a server or a player for playing three-dimensional images receives a three-dimensional image file uploaded by a user, if the user does not know a three-dimensional image format corresponding to the uploaded three-dimensional image file, a problem may occur when the user decodes the uploaded three-dimensional image file. For example, when a three-dimensional image file uploaded by the user has the top-and-bottom three-dimensional image format, if the user utilizes the side-by-side three-dimensional image format to decode the uploaded three-dimensional image file, the decoded image does not have a three-dimensional effect.

SUMMARY OF THE INVENTION

An embodiment provides a method of auto-determination a three-dimensional image format. The method includes a processor receiving an image signal; the processor capturing a plurality of frames from the image signal; the processor determining whether a red sub-pixel gray-level, a green sub-pixel gray-level, and a blue sub-pixel gray-level of each pixel of a right half side of each frame of the plurality of frames are the same; and the processor determining that the image signal has a two-dimensional image plus depth information three-dimensional image format when the red sub-pixel gray-level, the green sub-pixel gray-level, and the blue sub-pixel gray-level of the pixel are the same.

The present invention provides a method of auto-determination a three-dimensional image format. The method utilizes a processor to captures a plurality of frames from an image signal. Then, the processor determines whether the plurality of frames match a two-dimensional image plus depth information three-dimensional image format, a side-by-side three-dimensional image format, a top-and-bottom three-dimensional image format, or a frame packing three-dimensional image format according to characteristics of the two-dimensional image plus depth information three-dimensional image format, the side-by-side three-dimensional image format, the top-and-bottom three-dimensional image format, and the frame packing three-dimensional image format. Therefore, the present invention can be applied to a cloud server, a mobile device, a desktop computer, or any player for playing three-dimensional images.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
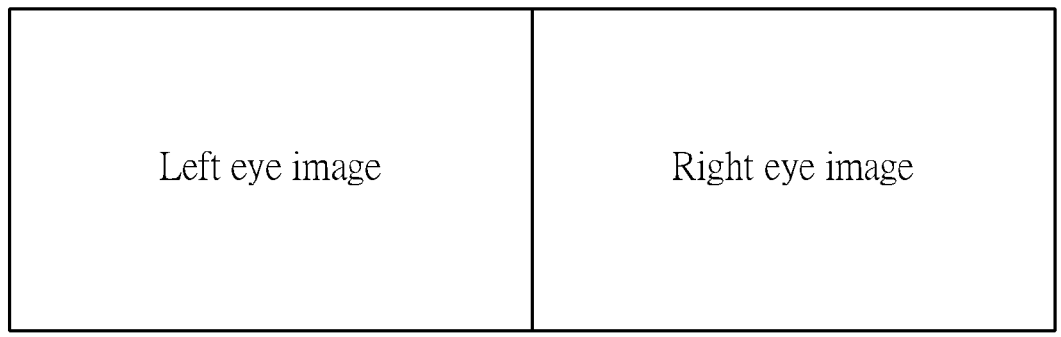
FIG. 1 is a diagram illustrating a side-by-side three-dimensional image format.
Figure 2:
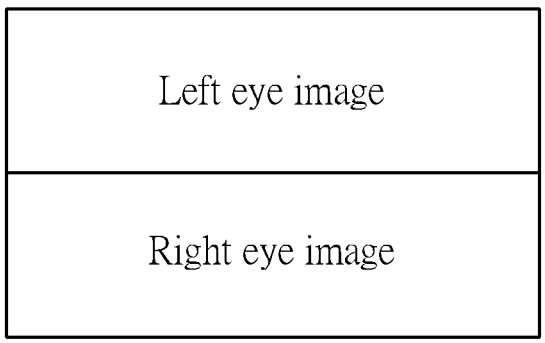
FIG. 2 is a diagram illustrating a top-and-bottom three-dimensional image format.
Figure 3:
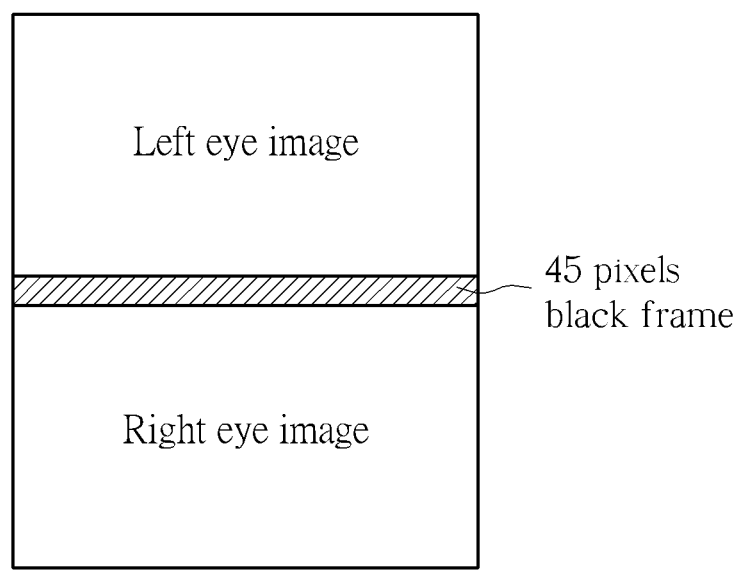
FIG. 3 is a diagram illustrating a frame packing three-dimensional image format.
Figure 4:
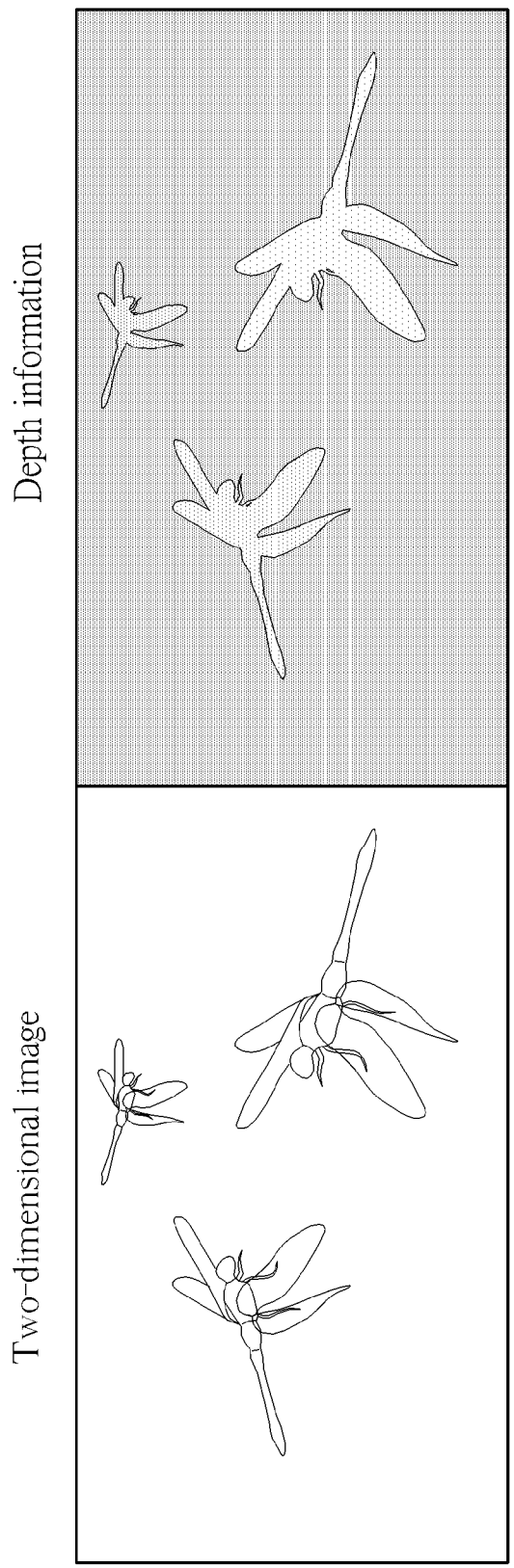
FIG. 4 is a diagram illustrating a two-dimensional image plus depth information three-dimensional image format.
Figure 5:
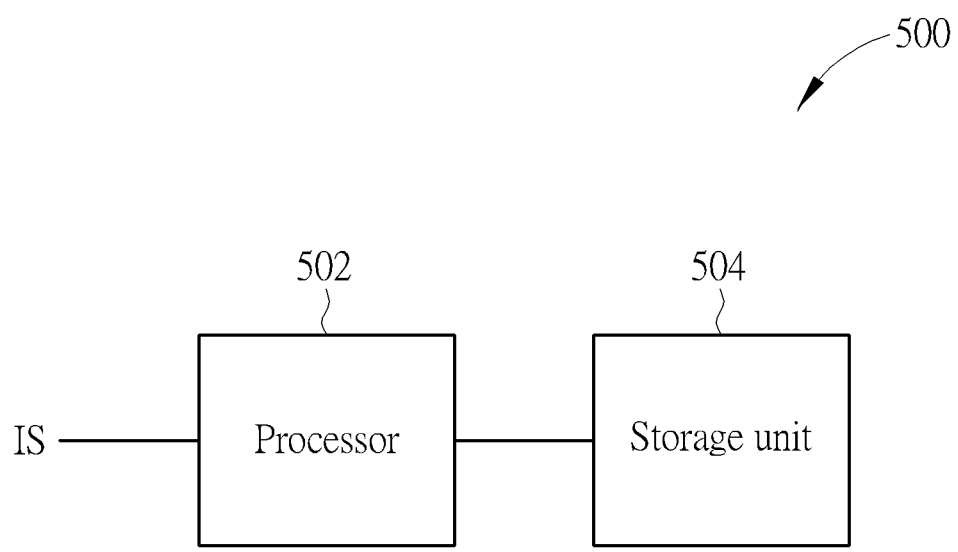
FIG. 5 is a diagram illustrating a device for automatically determining a three-dimensional image format according to an embodiment.
Figure 6A:
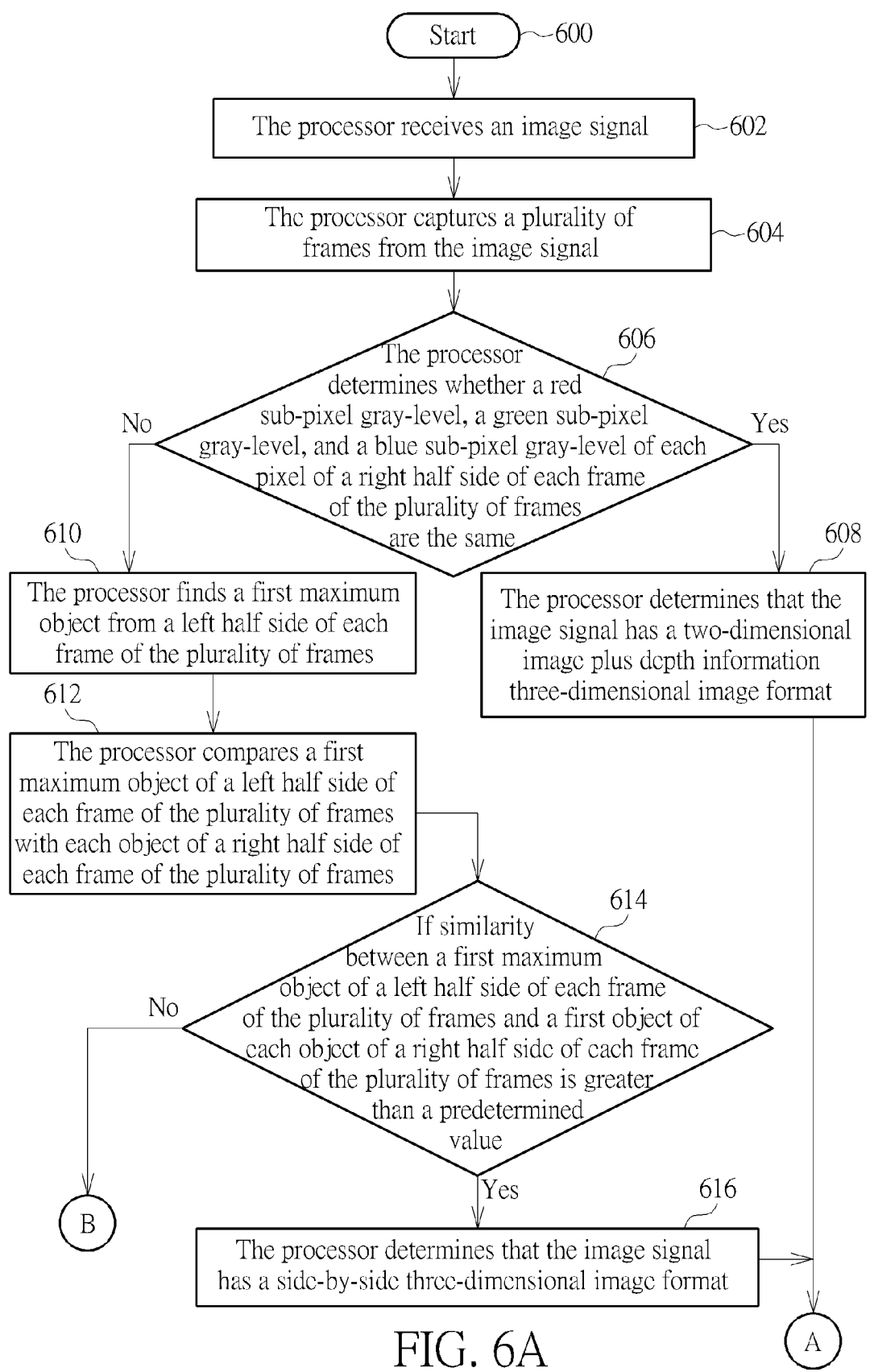
FIG. 6A and FIG. 6B are flowcharts illustrating a method of auto-determination a three-dimensional image format according to another embodiment.
Figure 6B:
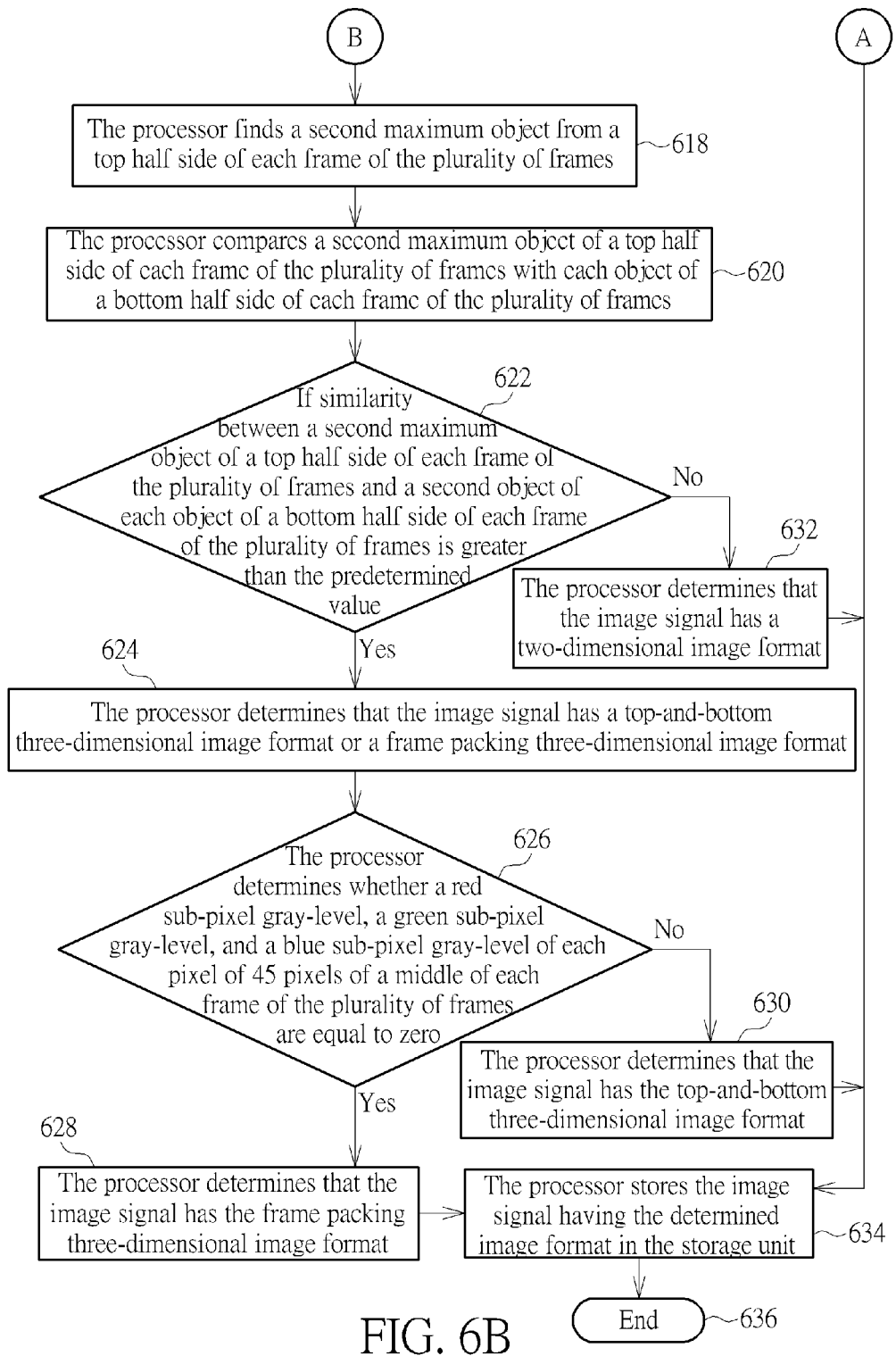

Please refer to FIG. 5, FIG. 6A, and FIG. 6B. FIG. 5 is a diagram illustrating a device 500 for automatically determining a three-dimensional image format according to an embodiment, and FIG. 6A and FIG. 6B are flowcharts illustrating a method of auto-determination a three-dimensional image format according to another embodiment. As shown in FIG. 5, the device 500 includes a processor 502 and a storage unit 504, where the processor 502 is used for determining a three-dimensional image format of an image signal, the storage unit 504 is used for storing an image signal which has a determined image format, and the device 500 is applied to a cloud server, a mobile device, a desktop computer, or any player for playing three-dimensional images. That is to say, the device 500 can be included in a cloud server, a mobile device, a desktop computer, or any player for playing three-dimensional images, or the device 500 can be coupled to a cloud server, a mobile device, a desktop computer, or any player for playing three-dimensional images. The method in FIG. 6A and FIG. 6B is illustrated using the device 500 in FIG. 5. Detailed steps are as follows:

Step 600: Start.

Step 602: The processor 502 receives an image signal IS.

Step 604: The processor 502 captures a plurality of frames from the image signal IS.

Step 606: The processor 502 determines whether a red sub-pixel gray-level, a green sub-pixel gray-level, and a blue sub-pixel gray-level of each pixel of a right half side of each frame of the plurality of frames are the same; if yes, go to Step 608; if no, go to Step 610.

Step 608: The processor 502 determines that the image signal IS has a two-dimensional image plus depth information three-dimensional image format; go to Step 634.

Step 610: The processor 502 finds a first maximum object from a left half side of each frame of the plurality of frames.

Step 612: The processor 502 compares a first maximum object of a left half side of each frame of the plurality of frames with each object of a right half side of each frame of the plurality of frames.

Step 614: If similarity between a first maximum object of a left half side of each frame of the plurality of frames and a first object of each object of a right half side of each frame of the plurality of frames is greater than a predetermined value; if yes, go to Step 616; if no, go to Step 618.

Step 616: The processor 502 determines that the image signal IS has a side-by-side three-dimensional image format; go to Step 634.

Step 618: The processor 502 finds a second maximum object from a top half side of each frame of the plurality of frames.

Step 620: The processor 502 compares a second maximum object of a top half side of each frame of the plurality of frames with each object of a bottom half side of each frame of the plurality of frames.

Step 622: If similarity between a second maximum object of a top half side of each frame of the plurality of frames and a second object of each object of a bottom half side of each frame of the plurality of frames is greater than the predetermined value; if yes, go to Step 624; if no, go to Step 632.

Step 624: The processor 502 determines that the image signal IS has a top-and-bottom three-dimensional image format or a frame packing three-dimensional image format.

Step 626: The processor 502 determines whether a red sub-pixel gray-level, a green sub-pixel gray-level, and a blue sub-pixel gray-level of each pixel of 45 pixels of a middle of each frame of the plurality of frames are equal to zero; if yes, go to Step 628; if no, go to Step 630.

Step 628: The processor 502 determines that the image signal IS has the frame packing three-dimensional image format; go to Step 634.

Step 630: The processor 502 determines that the image signal IS has the top-and-bottom three-dimensional image format; go to Step 634.

Step 632: The processor 502 determines that the image signal IS has a two-dimensional image format.

Step 634: The processor 502 stores the image signal IS having the determined image format in the storage unit 504.

Step 636: End.

In Step 602, the processor 502 can receives the image signal IS from a cloud server, a mobile device (e.g. a mobile phone, a tablet computer, or a Notebook computer), a desktop computer, or any player for playing three-dimensional images. In Step 604, because a first frame of the image signal IS is usually a black frame, the present invention does not utilize the first frame of the image signal IS to determine a three-dimensional image format of the image signal IS. In addition, the processor 502 randomly captures a plurality of frames (e.g. 5 frames) from the image signal IS to determine the three-dimensional image format of the image signal IS to increase determination accuracy of the three-dimensional image format of the image signal IS. When the plurality of frames (e.g. 5 frames) pass a test of the same three-dimensional image format, the processor 502 can confirm the three-dimensional image format of the image signal IS. But, the present invention is not limited to the plurality of frames being 5 frames. That is to say, the plurality of frames can be varied with a requirement and experience of a user.

A characteristic of the two-dimensional image plus depth information three-dimensional image format is that a red sub-pixel gray-level, a green sub-pixel gray-level, and a blue sub-pixel gray-level of each pixel of a right half side of each frame are the same. Therefore, in Step 606, the processor 502 determines whether a red sub-pixel gray-level, a green sub-pixel gray-level, and a blue sub-pixel gray-level of each pixel of a right half side of each frame of the plurality of frames are the same to determine whether the image signal IS has the two-dimensional image plus depth information three-dimensional image format.

In addition, because a left eye and a right eye of a human can sense different apparent depths corresponding to the same object, the processor 502 can utilize the above mentioned characteristic to determine whether the image signal IS has the side-by-side three-dimensional image format. In Step 610, after the processor 502 determines that the image signal IS does not have the two-dimensional image plus depth information three-dimensional image format, the processor 502 finds a first maximum object from a left half side of each frame of the plurality of frames. In Step 612, the processor 502 compares a first maximum object of a left half side of each frame of the plurality of frames with each object of a right half side of each frame of the plurality of frames. Then, in Step 614, the processor 502 determines whether similarity between a first maximum object of a left half side of each frame of the plurality of frames and a first object of each object of a right half side of each frame of the plurality of frames is greater than the predetermined value (e.g. 95%). But, the present invention is not limited to the predetermined value being 95%. That is to say, the predetermined value can be varied with a requirement and experience of the user. In Step 616, if the processor 502 determines that similarity between a first maximum object of a left half side of each frame of the plurality of frames and a first object of each object of a right half side of each frame of the plurality of frames is greater than the predetermined value (e.g. 95%), the processor 502 determines that the image signal IS has the side-by-side three-dimensional image format. Similarly, in Step 618 to Step 624, the processor 502 can utilize a similar determination method to determine that the image signal IS has the top-and-bottom three-dimensional image format or the frame packing three-dimensional image format. In Step 618 to Step 624, if the processor 502 determines that the image signal IS does not have the top-and-bottom three-dimensional image format and the frame packing three-dimensional image format, in Step 632, the processor 502 determines that the image signal IS has the two-dimensional image format.

Because a difference between the frame packing three-dimensional image format and the top-and-bottom three-dimensional image format is that a red sub-pixel gray-level, a green sub-pixel gray-level, and a blue sub-pixel gray-level of each pixel of 45 pixels of a middle of each frame of the frame packing three-dimensional image format are equal to zero, in Step 626, the processor 502 determines whether a red sub-pixel gray-level, a green sub-pixel gray-level, and a blue sub-pixel gray-level of each pixel of 45 pixels of a middle of each frame of the plurality of frames are equal to zero. In Step 628, when the processor 502 determines that a red sub-pixel gray-level, a green sub-pixel gray-level, and a blue sub-pixel gray-level of each pixel of 45 pixels of a middle of each frame of the plurality of frames are equal to zero, the processor 502 determines that the image signal IS has the frame packing three-dimensional image format. In Step 630, when the processor 502 determines that a red sub-pixel gray-level, a green sub-pixel gray-level, and a blue sub-pixel gray-level of each pixel of 45 pixels of a middle of each frame of the plurality of frames are not all equal to zero, the processor 502 determines that the image signal IS has the top-and-bottom three-dimensional image format. In addition, in Step 634, when the processor 502 determines the image format of the image signal IS (that is, the side-by-side three-dimensional image format, the top-and-bottom three-dimensional image format, the frame packing three-dimensional image format, the two-dimensional image plus depth information three-dimensional image format, or the two-dimensional image format), the processor 502 can stores the image signal IS in the storage unit 504 of the device 500. Because the device 500 is applied to a cloud server, a mobile device, a desktop computer, or any player for playing three-dimensional images, a cloud server, a mobile device, a desktop computer, or any player for playing three-dimensional images can access the image signal IS from the storage unit 504 and display the image signal IS according to the image format of the image signal IS when the user utilizes a cloud server, a mobile device, a desktop computer, or any player for playing three-dimensional images to display the image signal IS.

To sum up, the method of auto-determination a three-dimensional image format utilizes the processor to captures a plurality of frames from an image signal. Then, the processor determines whether the plurality of frames match the two-dimensional image plus depth information three-dimensional image format, the side-by-side three-dimensional image format, the top-and-bottom three-dimensional image format, or the frame packing three-dimensional image format according to characteristics of the two-dimensional image plus depth information three-dimensional image format, the side-by-side three-dimensional image format, the top-and-bottom three-dimensional image format, and the frame packing three-dimensional image format. Therefore, the present invention can be applied to a cloud server, a mobile device, a desktop computer, or any player for playing three-dimensional images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of auto-determination a three-dimensional image format, the method comprising following steps:
   receiving, by a processor, an image signal;
   capturing, by the processor, a plurality of frames from the image signal;
   determining, by the processor, whether a red sub-pixel gray-level, a green sub-pixel gray-level, and a blue sub-pixel gray-level of each pixel of a right half side of each frame of the plurality of frames are the same; and
   determining, by the processor, that the image signal has a two-dimensional image plus depth information three-dimensional image format when the red sub-pixel gray-level, the green sub-pixel gray-level, and the blue sub-pixel gray-level of the pixel are the same.

2. The method of claim 1, further comprising:
   finding, by the processor, a first maximum object from a left half side of the frame when the red sub-pixel gray-level, the green sub-pixel gray-level, and the blue sub-pixel gray-level of the pixel are not the same;
   comparing, by the processor, the first maximum object with each object of the right half side of the frame;
   comparing the first maximum object with a first object of each object of the right half side of the frame; and
   determining, by the processor, that the image signal has a side-by-side three-dimensional image format when a similarity between the first maximum object and the first object is greater than the predetermined value.

3. The method of claim 2, further comprising:
   storing, by the processor, the image signal having the side-by-side three-dimensional image format in a storage unit.

4. The method of claim 3, wherein the processor and the storage unit are comprised in a cloud server, a mobile device, a desktop computer, or a device of any player for playing three-dimensional images.

5. The method of claim 3, wherein the processor and the storage unit are comprised in a device, and the device is coupled to a cloud server, a mobile device, a desktop computer, or a device of any player for playing three-dimensional images.

6. The method of claim 2, further comprising:
   finding, by the processor, a second maximum object from a top half side of the frame when the similarity between the first maximum object and each object of the right half side of the frame is less than the predetermined value;
   comparing, by the processor, the second maximum object with each object of a bottom half side of the frame;
   comparing the second maximum object with a second object of each object of the bottom half side of the frame; and
   determining, by the processor, that the image signal has a top-and-bottom three-dimensional image format or a frame packing three-dimensional image format when a similarity between the second maximum object and the second object is greater than the predetermined value.

7. The method of claim 6, further comprising:
   storing, by the processor, the image signal having the top-and-bottom three-dimensional image format in a storage unit.

8. The method of claim 7, wherein the processor and the storage unit are comprised in a cloud server, a mobile device, a desktop computer, or a device of any player for playing three-dimensional images.

9. The method of claim 7, wherein the processor and the storage unit are comprised in a device, and the device is coupled to a cloud server, a mobile device, a desktop computer, or a device of any player for playing three-dimensional images.

10. The method of claim 6, further comprising:
    determining, by the processor, that the image signal has a two-dimensional image format when the similarity between the second maximum object and each object of the bottom half side of the frame is less than the predetermined value.

11. The method of claim 10, further comprising:
    storing, by the processor, the image signal having the two-dimensional image format in a storage unit.

12. The method of claim 11, wherein the processor and the storage unit are comprised in a cloud server, a mobile device, a desktop computer, or a device of any player for playing three-dimensional images.

13. The method of claim 11, wherein the processor and the storage unit are comprised in a device, and the device is coupled to a cloud server, a mobile device, a desktop computer, or a device of any player for playing three-dimensional images.

14. The method of claim 10, further comprising:
determining, by the processor, whether a red sub-pixel gray-level, a green sub-pixel gray-level, and a blue sub-pixel gray-level of each pixel of 45 pixels of a middle of the frame are equal to zero when the image signal has the top-and-bottom three-dimensional image format or the frame packing three-dimensional image format; and
determining, by the processor, that the image signal has the frame packing three-dimensional image format when a red sub-pixel gray-level, a green sub-pixel gray-level, and a blue sub-pixel gray-level of each pixel of the 45 pixels of the middle of the frame are equal to zero.

15. The method of claim 14, further comprising:
storing, by the processor, the image signal having the frame packing three-dimensional image format in a storage unit.

16. The method of claim 15, wherein the processor and the storage unit are comprised in a cloud server, a mobile device, a desktop computer, or a device of any player for playing three-dimensional images.

17. The method of claim 15, wherein the processor and storage unit are comprised in a device, and the device is coupled to a cloud server, a mobile device, a desktop computer, or a device of any player for playing three-dimensional images.

18. The method of claim 14, further comprising:
determining, by the processor, the image signal has the top-and-bottom three-dimensional image format when a red sub-pixel gray-level, a green sub-pixel gray-level, and a blue sub-pixel gray-level of each pixel of the 45 pixels of the middle of the frame are not all equal to zero; and
storing, by the processor, the image signal having the top-and-bottom three-dimensional image format in a storage unit.

19. The method of claim 18, wherein the processor and the storage unit are comprised in a cloud server, a mobile device, a desktop computer, or a device of any player for playing three-dimensional images.

20. The method of claim 18, wherein the processor and the storage unit are comprised in a device, and the device is coupled to a cloud server, a mobile device, a desktop computer, or a device of any player for playing three-dimensional images.

* * * * *